United States Patent [19]

Higgins

[11] Patent Number: 5,276,307
[45] Date of Patent: Jan. 4, 1994

[54] ELECTRICAL APPLIANCE WITH HERMETICALLY SEALED CONNECTOR HAVING VENTING MEANS

[75] Inventor: David T. Higgins, Lee's Summit, Mo.

[73] Assignee: Rival Manufacturing Company, Kansas City, Mo.

[21] Appl. No.: 897,458

[22] Filed: Jun. 11, 1992

[51] Int. Cl.⁵ .......................... A47J 37/08; H05B 3/00
[52] U.S. Cl. ................................ 219/386; 219/541; 439/206; 439/271; 439/485
[58] Field of Search ............... 219/385, 386, 521, 436, 219/438, 433, 434, 541; 439/485, 190, 192, 193, 194, 205, 271, 278, 281–283, 206, 99/446

[56] References Cited

U.S. PATENT DOCUMENTS

| | | | |
|---|---|---|---|
| 646,009 | 3/1900 | Pfatischer | 439/190 |
| 1,154,418 | 9/1915 | Kuhn et al. | 219/436 |
| 1,642,071 | 9/1927 | Hosking . | |
| 1,650,634 | 11/1927 | Lutzler . | |
| 1,845,638 | 2/1932 | Wermine | 439/485 |
| 1,976,779 | 10/1934 | Grant | 439/485 |
| 2,903,549 | 9/1959 | Joseph | 99/446 |
| 2,923,803 | 2/1960 | Kueser | 219/436 |
| 3,031,565 | 4/1962 | Appleton et al. | 219/541 |
| 3,449,706 | 6/1969 | Carissimi | 439/190 |
| 3,479,488 | 11/1969 | Klemm | 99/446 |
| 3,490,357 | 1/1970 | Lescure | 99/446 |
| 3,527,154 | 9/1970 | Shaper et al. . | |
| 3,543,672 | 12/1970 | Payonk . | |
| 3,594,696 | 7/1971 | Witek, Jr. | 439/278 |
| 3,623,422 | 11/1971 | Marshall . | |
| 3,678,844 | 7/1972 | Marshall . | |
| 3,738,256 | 6/1973 | Joeckel | 99/446 |
| 3,742,427 | 6/1973 | Ballard | 439/205 |
| 3,745,912 | 7/1973 | Field . | |
| 3,776,127 | 12/1973 | Muse . | |
| 3,789,748 | 2/1974 | Rappoport et al. . | |
| 3,805,688 | 4/1974 | Gvozdjak . | |
| 3,811,375 | 5/1974 | Fritzsche . | |
| 3,848,110 | 11/1974 | Giguere et al. . | |
| 3,976,352 | 8/1976 | Spinner | 439/281 |
| 4,435,638 | 3/1984 | Simon | 219/433 |
| 4,454,805 | 6/1984 | Matthews . | |
| 4,694,816 | 9/1987 | Fabbro . | |
| 4,729,297 | 3/1988 | Iranzadi . | |
| 4,862,795 | 9/1989 | Hawkins . | |
| 4,909,137 | 3/1990 | Brugnoli . | |
| 5,114,359 | 5/1992 | Chisima et al. | 439/271 |

FOREIGN PATENT DOCUMENTS

| | | | |
|---|---|---|---|
| 538778 | 11/1931 | Fed. Rep. of Germany | 439/206 |
| 3414213 | 10/1985 | Fed. Rep. of Germany | 99/446 |
| 177065 | 4/1933 | Sweden | 439/206 |
| 124844 | 3/1928 | Switzerland | 439/206 |

OTHER PUBLICATIONS

Brochure, *Brinkmann* for the Smoke 'N Grill outdoor electric cooker.

*Primary Examiner*—Bruce A. Reynolds
*Assistant Examiner*—John A. Jeffery
*Attorney, Agent, or Firm*—Willian Brinks Hofer Gilson & Lione

[57] ABSTRACT

An outdoor grill of the type having a base, a cover, a food-supporting grill and a heating element includes an electrical housing having a support member removably disposed within the outdoor grill, and a housing member secured to the support member. The housing member is shaped to define a cavity wherein at least one electrical connection is located. The top and the sides of the housing member define a nonperforated surface which substantially prevents substances damaging to the at least one electrical connection from entering the cavity. In case damaging substances do enter the cavity, the bottom of the housing member defines a surface having at least one vent for venting the substances from the housing.

23 Claims, 3 Drawing Sheets

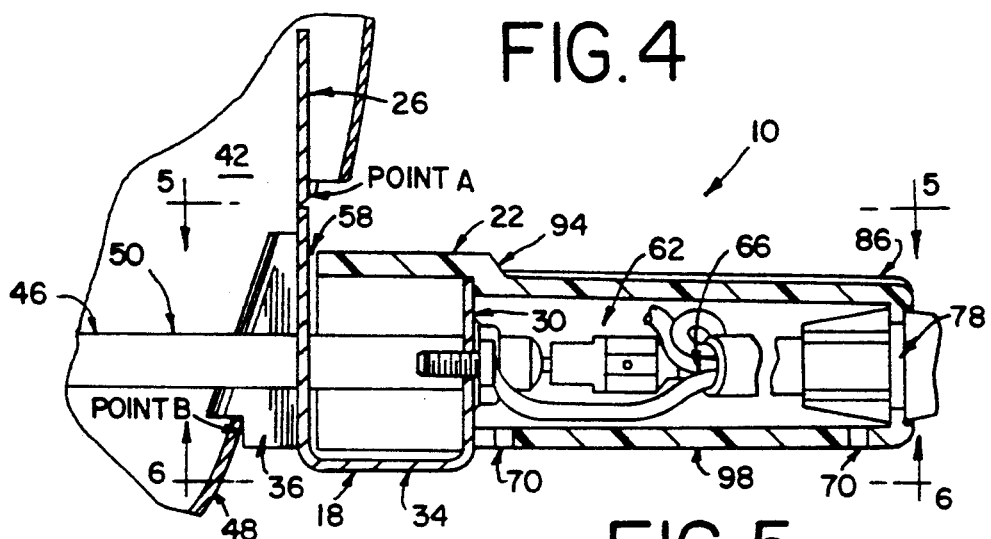
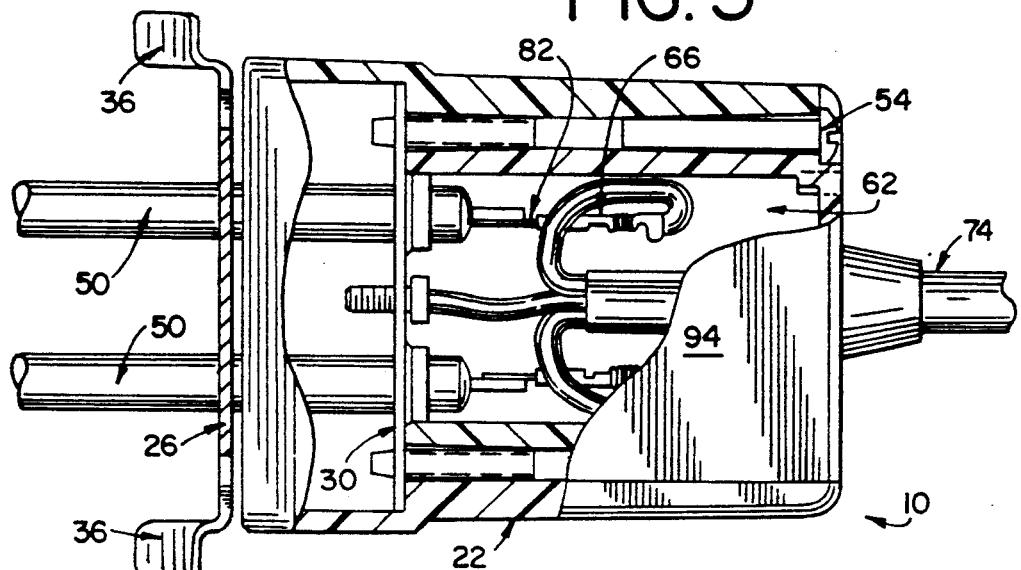
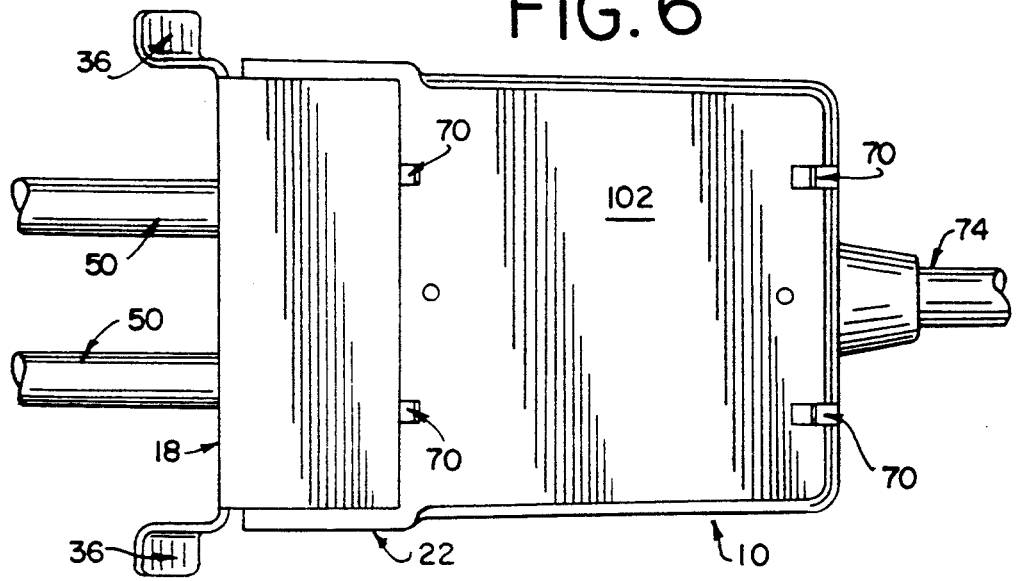

ELECTRICAL APPLIANCE WITH HERMETICALLY SEALED CONNECTOR HAVING VENTING MEANS

BACKGROUND OF THE INVENTION

The present invention relates generally to the field of electrical housings for appliances, and more particularly to an electrical housing for outdoor appliances.

Electrical wires and connections in appliances are typically contained in protective housings or coatings to prevent the occurrence of short-circuits, fires, electric shock and other similar undesirable incidents. The use of such protective housings is especially important for outdoor appliances, where the appliances' exposure to the elements increases the risk of the previously described events.

To reduce the risk of injury and short-circuits, electrical wires and connections have been encased in a coating of rubber, plastic, or other similar non-conductive material. Electrical connections have also been placed in metallic or plastic electrical receptacles. Often, these receptacles are not covered with a non-conductive and/or water-resistant material to protect the electrical connections from the elements.

The above-described electrical housings do not possess the desired advantages of weather protection and ease of access to the protected electrical connections. If an appliance utilizing a protective coating over electrical connections requires maintenance or repair, the protective coating may be damaged in the process of uncovering the wires and connections. On the other hand, an appliance utilizing an electrical receptacle allows ready access to the electrical connections, but the electrical receptacle may not be sufficiently weather resistant to permit safe use of the appliance outdoors.

Additionally, while protective coatings usually prevent substances damaging to the wires and connections from contacting the wires and connections, once such substances do penetrate the coating there are usually no available means for venting the substances out of the coating. Furthermore, the use of rubber or plastic coatings to protect the wires and connections is relatively expensive due to the cost of such materials.

It is, therefore, an object of the present invention to provide an electrical housing for appliances that is substantially weather-proof.

It is another object of the present invention to provide an electrical housing that vents substances damaging to electrical wires and connections from the housing if such substances do happen to enter the housing.

It is still another object of the present invention to provide an electrical housing that permits ease of access to the electrical wires and connections of the appliance.

It is yet another object of the present invention to provide an electrical housing that is designed to reduce heat transfer from the appliance to the electrical housing.

SUMMARY OF THE INVENTION

According to a first aspect of the present invention, an outdoor grill of the type including a base, a cover, a food-supporting grill and a heating element is provided with an improved electrical housing comprising a support member removably disposed within the outdoor grill, and a housing member secured to the support member and shaped to define a cavity wherein at least one electrical connection is located, the top and the sides of the housing member defining a nonperforated surface which substantially prevents substances damaging to the at least one electrical connection from entering the cavity, the bottom of the housing member defining a surface having at least one vent for venting substances damaging to the at least one electrical connection from the housing member in the event such substances enter the cavity.

According to a second aspect of the present invention, an outdoor appliance comprising a water-resistant electrical housing is provided including a support member having a first portion and a second portion, the support member removably disposed within the appliance and housing an electrical element disposed therethrough, and a housing member secured to said support member and comprising means for receiving a power wire, the housing member shaped to define a cavity wherein at least one electrical connection between the power wire and the electrical element is located, the top and the sides of the housing member defining a nonperforated surface which substantially prevents substances damaging to the at least one electrical connection from entering the cavity, the housing member substantially covering the support member such that the housing member and the first portion of the support member cooperate to define an air gap therebetween, the air gap operative to reduce heat transfer from the appliance to the housing member.

In the preferred embodiment of the present invention, the bottom of the housing member defines a surface having a plurality of vents for venting substances damaging to the at least one electrical connection from the housing member.

BRIEF DESCRIPTION OF THE DRAWINGS

FIG. 4 is a cross-sectional side view of the electrical housing shown in FIGS. 1, 2 and 3;

FIG. 5 is a top view of the electrical housing, partially in section, taken along line 5—5 of FIG. 4; and FIG. 6 is a bottom view of the electrical housing taken along line 6—6 of FIG. 4.

DETAILED DESCRIPTION OF THE PRESENTLY PREFERRED EMBODIMENTS

Figure 1:
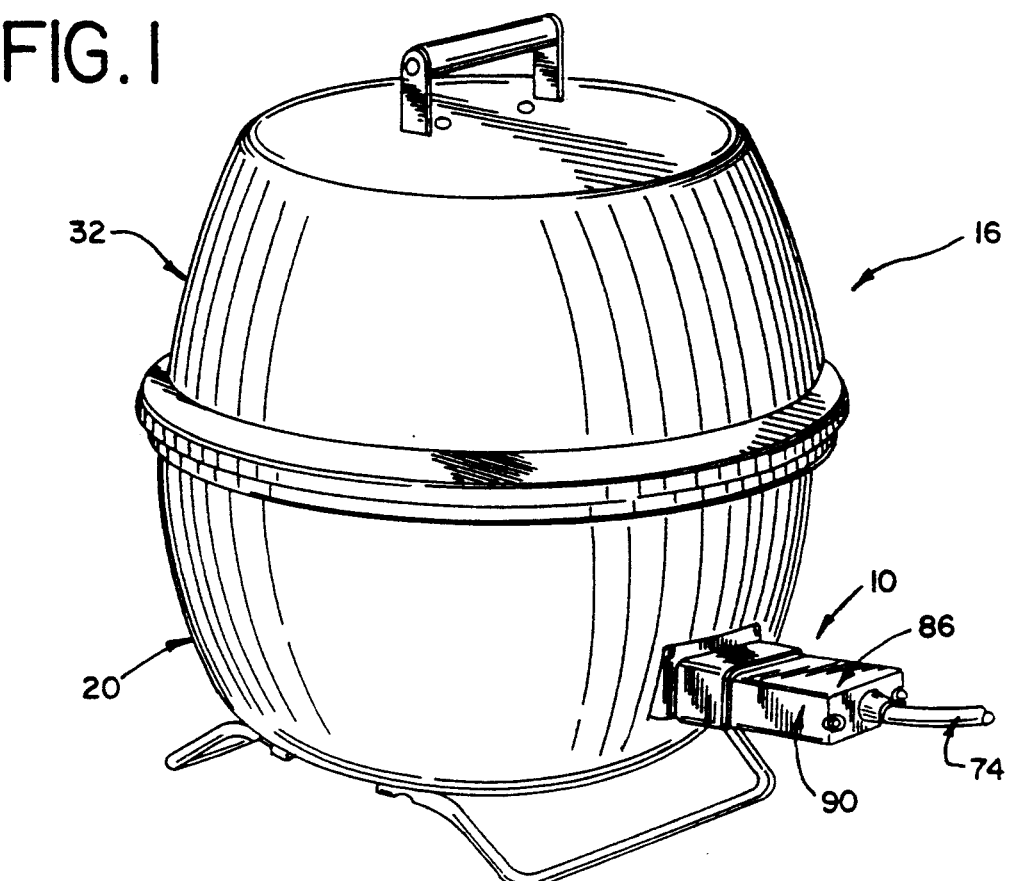
FIG. 1 is a perspective view of an outdoor grill incorporating a presently preferred embodiment of the electrical housing.

The electrical housing 10 of the present invention may be used in any suitable type of electrical appliance, particularly those for outdoor use. Preferably, however, as shown in FIG. 1, the electrical housing 10 is used in an outdoor grill 16.

Figure 2:
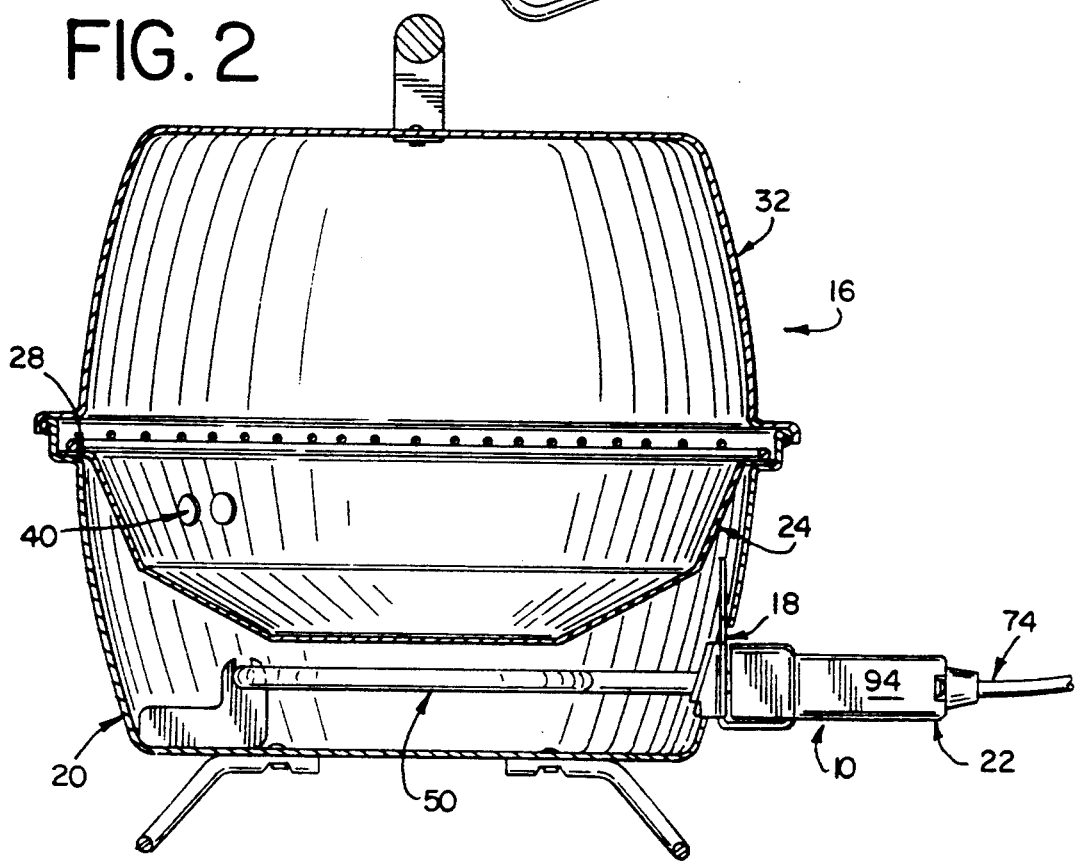
FIG. 2 is a cross-sectional side view of the outdoor grill and the electrical housing of FIG. 1.
Figure 3:
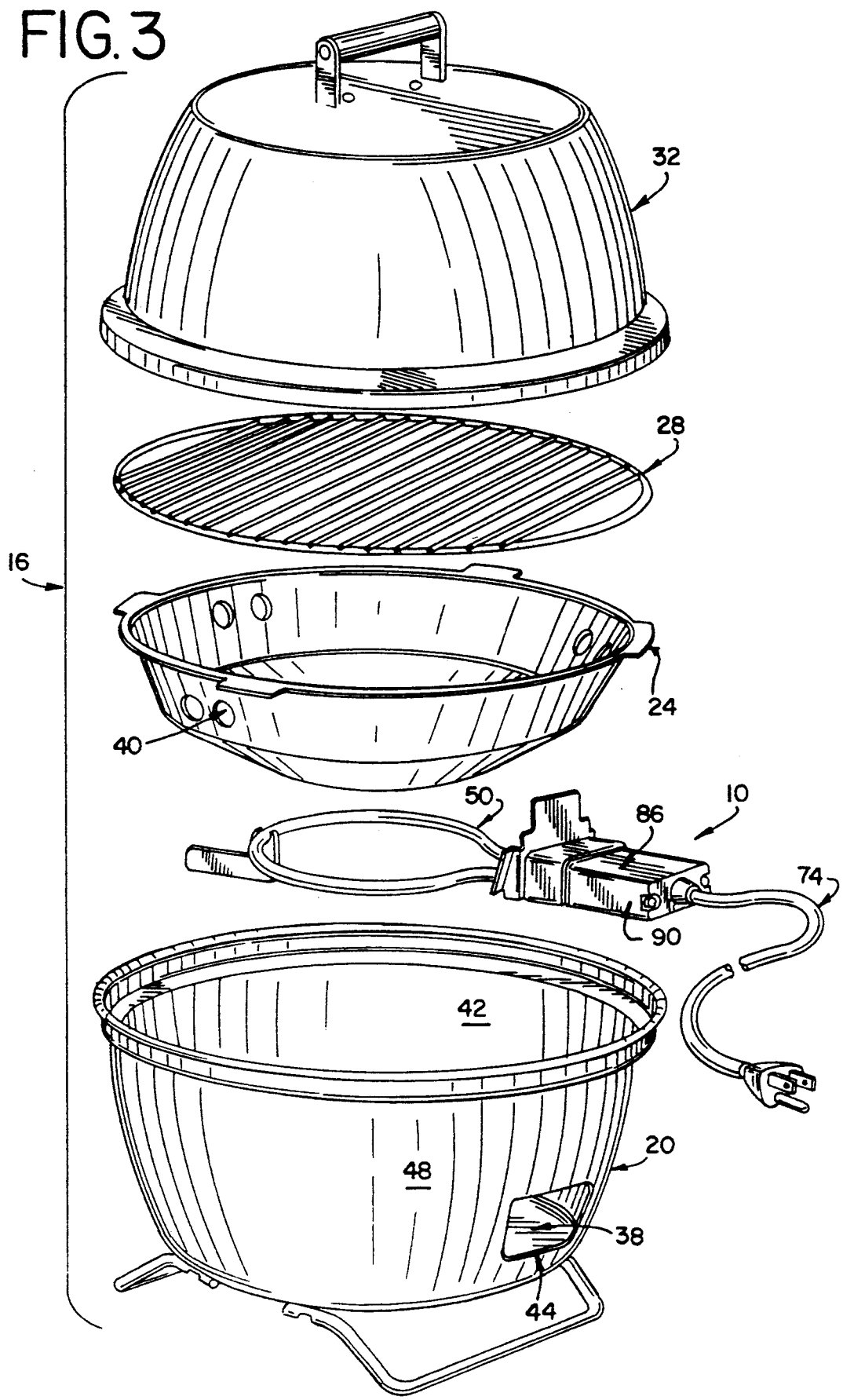
FIG. 3 is an exploded perspective view of the outdoor grill of FIG. 1.

As best shown in FIGS. 2 and 3, the outdoor grill 16 comprises a base 20, a heating element 50, a drip pan 24 having a plurality of apertures 40, a food-supporting grill 28, a cover 32, and the electrical housing 10.

As best shown in FIG. 4, the electrical housing 10 comprises a support member 18 and a housing member 22. The support member 18 may be configured in any way suitable for mounting the electrical housing 10 on an appliance (not shown). Preferably, the support member 18 comprises a first portion 26 and a second portion 30 that cooperate to define a U-shaped bracket 34. The first portion 26 preferably also includes side flanges 36 positioned on opposite sides thereof.

As shown in FIGS. 2-4, the support member 18 is positioned within an opening 38 in the base 20 of the outdoor grill 16 such that the side flanges 36 of the first portion 26 rest against the bottom ledge 44 of the opening 38 and the outside wall 48 of the grill 16. The first portion 26 also engages the inside wall 42 of the grill 16. The support member 18 is able to support the electrical housing 10 because the weight of the electrical housing 10 biases the first portion 26 against both the inside wall 42 of the grill 16 at point A and the outside wall 48 of the grill 16 at Point B. The support member 18 is preferably not secured to the grill 16 so that it may be easily removed from the grill 16.

An electrical element 46 is supported within the support member 18. Preferably, the electrical element 46 is supported through both the first portion 26 and the second portion 30. The electrical element 46 shown in FIGS. 2-6 comprises an electrical resistance heating element 50. However, the electrical element 46 may comprise any suitable type of electrical component used in appliances, including electrical wire transmission means such as electrical conduits (not shown), which channel wires to other electrical components.

The housing member 22 is secured to the support member 18 by any suitable means, including screws 54 (FIG. 5). Preferably, the housing member 22 is secured to the second portion 30 of the support member 18. The housing member 22 substantially covers the support member 18 such that an air gap 58 is defined between the housing member 22 and the first portion 26 of the support member 18. The air gap 58 reduces heat transfer from the grill 16 to the housing member 22 and is preferably not more than about ⅛ of an inch wide.

The housing member 22 is shaped to define a cavity 62 adjacent to the second portion 30 of the support member 18. Means for receiving a power wire 74 from a power source (not shown) may be included in the housing member 22. The power wire receiving means may include any electrical connection means suitable for the application, including plugs, sockets and jacks. Preferably, the power wire receiving means comprises a sealed aperture 78 through which the power wire 74 is placed. Preferably, the power wire 74 and the electrical element 46 extend from opposite ends of the electrical housing 10.

The cavity 62 contains at least one electrical connection 66 between electrical leads 82 from the electrical element 46 and, preferably, the power wire 74. The power wire 74 is not necessarily the only electrical component to which the electrical leads 82 from the electrical element 46 are connected, and the electrical leads 82 may be connected to leads from other electrical elements (not shown). The use of screws 54 or other nonpermanent means for securing the housing member 22 to the support member 18 allows one to easily remove the housing member 22 from the support member 18 to gain access to the electrical connections 66 contained within the cavity 62.

The top 86 and the sides 90 of the housing member 22 define a nonperforated surface 94 which substantially prevents substances damaging to the electrical connections 66 from entering the cavity 62. The bottom 98 of the housing member 22 defines a surface 102 comprising at least one vent 70 for venting substances damaging to the electrical connections 66 from the housing member 22 in the event such substances do enter the cavity 62. Preferably, however, the bottom 98 of the housing member 22 defines a surface 102 comprising a plurality of vents 70.

The following materials have been found suitable for use in the preferred embodiment of the electrical housing 10: the housing member 22 may be formed of Phenolic, Durez 152, supplied by Occidental Chemical Company; and the support member 18 may be formed of electro-galvanized sheet steel.

The electrical housing 10 of the present invention may be easily removed from the outdoor grill 16 or any other suitable appliance. Additionally, if the electrical element 46 is a self-contained unit, e.g., a heating element 50, the electrical housing 10 and the electrical element 46 may be removed as one unit. The two-part configuration of the electrical housing 10, i.e., the support member 18 and the housing member 22, provides both a substantially water-proof cavity 62 for electrical connections 66 and an air gap 58 for reducing heat transfer from the outdoor grill 16 to the electrical housing 10. The support member 18 and the housing member 22 are formed of relatively inexpensive materials. Therefore, the electrical housing 10 may be less expensive than conventional housings. Furthermore, the top 86 and the sides 90 of the housing member 22 define a nonperforated surface 94 that substantially prevents water and other damaging substances from entering the cavity 62. In case such damaging substances do enter the cavity 62, the bottom 98 of the housing member 22 comprises at least one vent 70 for draining the substances from the housing member 22. Thus, the electrical housing 10 is designed with a fail-safe feature that drains water and other substances damaging to the electrical connections 66 from the housing member 22 in the event such substances do penetrate the nonperforated surface 94 of the housing member 22 and enter the cavity 62.

The electrical housing 10 of the present invention may be used in any suitable electrical appliance, including outdoor and indoor varieties. In alternate embodiments of the present invention, the support member 18 may be shaped and configured to fit any suitable appliance Consequently, the housing member 22 may be configured as necessary to conform to the shape of the support member 18. Furthermore, the support member 18 may be secured to an appliance by any suitable means.

The embodiments described above are to be considered in all respects only as illustrative and not restrictive. The scope of the invention is indicated by the following claims rather than by the foregoing description. All changes which come within the meaning and range of equivalency of the claims are to be embraced within their scope.

I claim:

1. In combination with an outdoor grill of the type including a base, a cover, a food-supporting grill and a heating element, the improvement comprising an electrical housing comprising:

a) a support member removably disposed within the outdoor grill, said support member comprising a first portion and a second portion; and b) a housing member secured to said support member and shaped to define a cavity wherein at least one electrical connection is located, the top and the sides of said housing member defining a nonperforated surface which substantially prevents substances damaging to the at least one electrical connection from entering the cavity, the bottom of said housing member defining a surface comprising at least one vent for venting substances damaging to the at least one electrical connection from said housing member in the event such substances enter the cavity, said housing member substantially covering said support member such that said housing member and the first portion of said support member cooperate to define an air gap therebetween, the air gap being operative to reduce heat transfer from the grill to said housing member.

2. The apparatus of claim 1 wherein said support member supports an electrical element disposed therethrough.

3. The apparatus of claim 2 wherein the electrical element comprises a heating element.

4. The apparatus of claim 2 wherein the electrical housing and the electrical element may be removed from the outdoor grill as a unit.

5. The apparatus of claim 1:
a) wherein said support member comprises a U-shaped channel; and
b) wherein the first and second portions of said support member comprise the two parallel legs of the U-shaped channel.

6. The apparatus of claim 1 wherein the first portion is partially disposed within the base of the outdoor grill.

7. The apparatus of claim 1 wherein said housing member is secured to the second portion of said support member.

8. The apparatus of claim 1 wherein the gap is not more than about ⅛ of an inch wide.

9. The apparatus of claim 1 wherein the bottom of said housing member defines a surface comprising a plurality of vents.

10. The apparatus of claim 1 wherein said housing member comprises means for receiving a power wire.

11. An outdoor appliance comprising a water-resistant electrical housing comprising:
a) a support member comprising a first portion and a second portion, said support member removably disposed within the appliance and supporting an electrical element disposed therethrough; and
b) a housing member secured to said support member and comprising means for receiving a power wire, said housing member shaped to define a cavity wherein at least one electrical connection between the power wire and the electrical element is located, the top and the sides of said housing member defining a nonperforated surface which substantially prevents substances damaging to the at least one electrical connection from entering the cavity, said housing member substantially covering said support member such that said housing member and the first portion of said support member cooperate to define an air gap therebetween, the air gap being operative to reduce the heat transfer from the appliance to said housing member.

12. The outdoor appliance of claim 11 wherein the bottom of said housing member defines a surface comprising at least one vent for venting substances damaging to the at least one electrical connection from said housing in the event such substances enter the cavity.

13. The outdoor appliance of claim 12 wherein the bottom of said housing member defines a surface comprising a plurality of vents.

14. The outdoor appliance of claim 11 wherein the gap is not more than about ⅛ of an inch wide.

15. The outdoor appliance of claim 11:
a) wherein said support member comprises a U-shaped channel; and
b) wherein the first and second portion of said support member comprise the two parallel legs of the U-shaped channel.

16. The outdoor appliance of claim 11 wherein said housing member is secured to the second portion of said support member.

17. The outdoor appliance of claim 11 wherein the electrical element comprises an electrical resistance heating element.

18. The outdoor appliance of claim 17 wherein the electrical element and the power wire extend from opposite ends of said housing member.

19. A water-resistant electrical housing for an electrical appliance comprising:
a) a support member comprising a first portion and a second portion, the first portion having at least one side flange and adapted to engage an inside wall of the appliance, said support member removably disposed within the appliance; and
b) a housing member secured to said support member and shaped to define a cavity wherein at least one electrical connection is located, the top and the sides of said housing member defining a nonperforated surface which substantially prevents substances damaging to the at least one electrical connection from entering the cavity, said housing member substantially covering said support member such that said housing member and the first portion of said support member cooperate to define an air gap therebetween, the air gap being operative to reduce heat transfer from the appliance to said housing member.

20. The electrical housing of claim 19 wherein the at least one side flange comprises two side flanges.

21. The electrical housing of claim 20 wherein the two side flanges are positioned on opposite sides of the first portion.

22. The electrical housing of claim 19 wherein said support member is positioned within an opening in the appliance, and further wherein the at least one side flange rests against a bottom ledge of the opening.

23. The electrical housing of claim 19 wherein the weight of the housing biases the first portion of the support member against the inside wall of the appliance.

* * * * *